(12) United States Patent
Oliver et al.

(10) Patent No.: US 8,549,166 B2
(45) Date of Patent: Oct. 1, 2013

(54) EXECUTION OF UNVERIFIED PROGRAMS IN A WIRELESS, DEVICE OPERATING ENVIRONMENT

(75) Inventors: Mitchell B. Oliver, San Diego, CA (US); Gerald Charles Horel, Brentwood Bay (CA); Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2086 days.

(21) Appl. No.: 10/791,160

(22) Filed: Mar. 1, 2004

(65) Prior Publication Data

US 2005/0193101 A1 Sep. 1, 2005

(51) Int. Cl.
*G06F 15/16* (2006.01)

(52) U.S. Cl.
USPC .......................................... 709/232; 709/225

(58) Field of Classification Search
None
See application file for complete search history.

(56) References Cited

U.S. PATENT DOCUMENTS

| | | | |
|---|---|---|---|
| 6,035,303 A | 3/2000 | Baer et al. | |
| 6,138,009 A | 10/2000 | Birgerson | |
| 6,226,675 B1 | 5/2001 | Meltzer et al. | |
| 6,317,742 B1* | 11/2001 | Nagaratnam et al. | 1/1 |
| 6,594,505 B1 | 7/2003 | Ishii et al. | |
| 6,691,230 B1* | 2/2004 | Bardon | 726/27 |
| 6,901,251 B1* | 5/2005 | Kiessling et al. | 455/410 |
| 7,099,916 B1* | 8/2006 | Hericourt et al. | 709/203 |
| 7,467,417 B2* | 12/2008 | Stillerman et al. | 726/30 |
| 2001/0051928 A1* | 12/2001 | Brody | 705/52 |
| 2002/0026474 A1 | 2/2002 | Wang et al. | |
| 2002/0112154 A1* | 8/2002 | Wallace | 713/153 |
| 2002/0131404 A1 | 9/2002 | Mehta et al. | |
| 2002/0152378 A1* | 10/2002 | Wallace et al. | 713/168 |
| 2003/0145316 A1* | 7/2003 | McKinlay et al. | 717/173 |
| 2004/0043753 A1* | 3/2004 | Wake et al. | 455/406 |
| 2004/0081110 A1* | 4/2004 | Koskimies | 370/315 |
| 2004/0093595 A1* | 5/2004 | Bilange | 717/171 |
| 2004/0172447 A1* | 9/2004 | Miller | 709/203 |
| 2004/0176068 A1* | 9/2004 | Paatero | 455/410 |
| 2004/0220998 A1* | 11/2004 | Shenfield et al. | 709/201 |
| 2005/0033969 A1* | 2/2005 | Kiiveri et al. | 713/189 |
| 2012/0054864 A1* | 3/2012 | Linn et al. | 726/22 |

FOREIGN PATENT DOCUMENTS

| | | |
|---|---|---|
| CN | 1267431 | 9/2000 |
| JP | 2001117769 | 4/2001 |
| WO | 9616685 | 6/1996 |
| WO | 0049547 | 8/2000 |

(Continued)

OTHER PUBLICATIONS

"Applied Cryptography in Java," Security Technology, 1999, Proceedings, IEEE 3rd Annual 1999 International Carnahan Conference, pp. 345-348 (Oct. 5, 1999).
International Search Report—PCT/US05/005908, International Search Authority—ISA/US—Jun. 4, 2008.

(Continued)

*Primary Examiner* — Dhairya A Patel
(74) *Attorney, Agent, or Firm* — Fariba Yadegar-Bandari

(57) ABSTRACT

A computer device having wireless communication capability and a computer platform with a resident application environment for selectively downloading applications to the platform across the wireless network with a predefined security protocol for downloading and executing applications at the platform, such as verifying the presence of a certificate. The download manager is resident on the computer platform and allows download, storage, and execution of applications that do not otherwise comply with the security protocol of the resident application environment.

25 Claims, 3 Drawing Sheets

(56) References Cited

FOREIGN PATENT DOCUMENTS

| WO | 0126401 | 4/2001 |
|---|---|---|
| WO | WO0203732 A1 | 1/2002 |
| WO | WO02075527 | 9/2002 |
| WO | WO02097620 | 12/2002 |
| WO | WO2004015553 | 2/2004 |

OTHER PUBLICATIONS

Written Opinion—PCT/US05/005908, International Search Authority—ISA/US—Jun. 4, 2008.
Supplementary European Search Report—EP05714031, Search Authority—The Hague.
Patent Office, Dec. 16, 2009.

* cited by examiner

EXECUTION OF UNVERIFIED PROGRAMS IN A WIRELESS, DEVICE OPERATING ENVIRONMENT

FIELD

The present invention generally relates to communication between computer devices across wireless computer networks. More particularly, the invention relates to the operating system and environment of the computer platform of a wireless device, and the ability to download and execute programs that are not verified (or certified) to properly operate in the wireless device environment.

DESCRIPTION OF THE RELATED ART

Computer devices that are networked to other computer devices, either through a direct connection or in a wireless network, have the ability to download programs from the other computer devices, and store and execute the downloaded programs. In particular, wireless communication devices, such as cellular phones, PDAs, mini-laptops, and advanced pagers, can include a computer platform which allows the download and execution of applications. However, these devices typically have limited storage capability and their operating environment is greatly curtailed from a full operating system common to desktop personal computers (PCs) and servers.

One example of a highly optimized Java runtime environment is the Java 2 Platform, Micro Edition (J2ME) which is intended to operate on devices with limited computing capabilities, such wireless communication devices. In J2ME, a "mobile information device profile" (MIDP), combined with the "connected limited device configuration" (CLDC), is the Java runtime environment providing a core application functionality required at the wireless computer device, such as the user interface (UI), network connectivity, local data storage, and application lifecycle management. In J2ME, there are several standard application-programming interfaces (APIs) and other tools, such as the "Java Virtual Machine" (JVM).

The JVM interprets compiled Java binary code (often called "bytecode") for the hardware platform so that the device can perform Java instructions. One benefit of the use of Java is that it allows application programs to be constructed that can execute on any computer platform without having to be rewritten or recompiled by the programmer. The JVM permits this because it tracks the specific instruction lengths and other attributes of the computer platform, and defines an abstract machine or processor, in essence, an abstract instruction set, set of registers, a stack, a heap, and a method area. Thus, once a JVM has been implemented for a given computer platform, any Java program can run on that platform. A JVM can either interpret the bytecode one instruction at a time (thus mapping the instruction to a current processor instruction) or the bytecode can be compiled further for the real processor using what is called a "just-in-time compiler."

The common types of programs downloaded by the Java-based or compatible computer devices are "applets." An applet is a small program that is typically sent along with a Web page to a user, and can perform interactive animations, immediate calculations, or other simple tasks without having to send a user request back to the server. Other applets, called "MIDlets" are applications designed to run on wireless Java enabled devices and are provided across the wireless network for download to the wireless computer device.

The downloaded programs however must be compatible with the software environment of the device intending to execute the program or else errors can occur. To insure that downloaded applications can be executed in the resident environment, a security protocol is often used such as verifying the presence of digital certificates within the downloaded software application. For example, Verisign® will issue a "Class 3 certificate" for inclusion within the program to an organization after authentication that an organization exists, has a name, and is entitled to use that name. And if the resident application environment is designed to only work with applications that have been signed with a specific certificate, or otherwise distributed in a certain manner, the computer device will not be able to obtain applications that do not meet the predetermined security protocol. In most instances, the resident application environment will refuse to download the application, much less attempt to execute unverified application. However, many unverified applications pose no risk to the resident application environment and the user of the computer device has no ability to obtain the otherwise safe, unverified application due to the safety protocol.

Accordingly, it would be advantageous to provide a system for a wireless computer device, such as a cellular telephone, PDA, or other device, to download, store and execute programs that are not verified for execution in the operating system or application environment resident on the wireless device. Such system should allow the use of the unverified program with minimal risk of adversely affecting the resident application environment or device operating system. It is thus to the provision of such a system and method of enabling a wireless device to download and execute unverified and non-security protocol complying applications that the present invention is primarily directed.

SUMMARY OF THE INVENTION

The present invention is a system and method at computer device having a wireless communication capability to download and execute programs that do not meet the proper security protocol, such as certificate verification, to properly operate in the wireless device application environment. The wireless computer device includes a wireless communication portal for selectively sending and receiving data across a wireless network, a computer platform including a resident application environment and selectively downloading applications to the platform through the portal, and a data store that is in communication with the computer platform and selectively sends data to and receives data from the computer platform. The resident application environment utilizes a predefined security protocol for at least executing a downloaded application and a download manager is resident on the computer platform that at least selectively downloads applications that do not comply with the predefined security protocol. The download manager can also execute and store the unverified application, and can use the existing interfaces and methods of the resident application environment to handle the unverified application, such as the user interface or storage directory, or can use its own interface and method, or both.

The method for selectively downloading through a wireless connection to a computer device an application that does not comply with a predefined security protocol for use at that computer device includes the steps of downloading to the computer platform an application that does not comply with the predefined security protocol and the executing the application at the computer device with the download manager. The method can also include the step of storing the downloaded unverified application for later execution. Further, the step of executing the downloaded application with the download manager can occur either inside, outside, or partially inside of the resident application environment.

It is therefore an object of the system and method to provide a wireless computer device, such as a cellular telephone or PDA, that can download, store and execute programs that are not verified or do not otherwise meet the safety protocol for execution in the operating system or application environment resident on the wireless device. A download manager that can exist as part of or separate from the resident application environment manages the use of the unverified program with minimal risk of adversely affecting the resident application environment. The download manager can be easily implemented utilizing the tools of an existing resident application environment, selectively use the other tools of the environment, and can present its own interface and perform separate file management of unverified applications.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
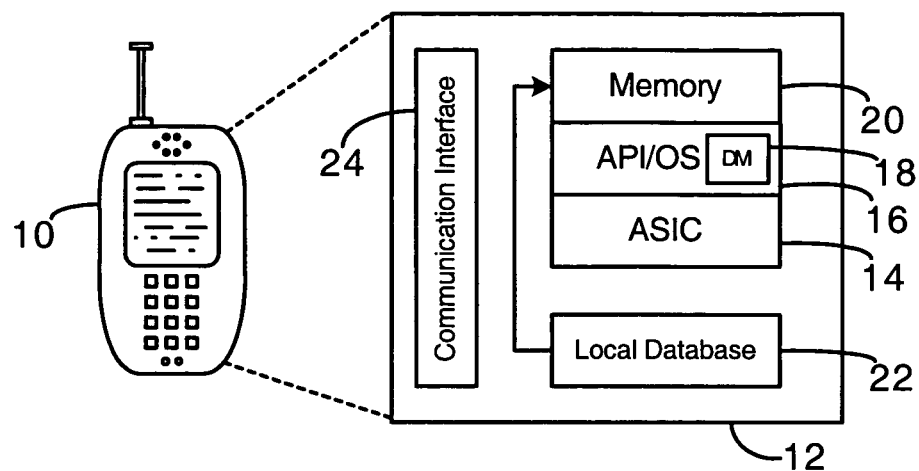
FIG. 1 is a block diagram of a computer architecture on a wireless device including on the platform a resident download manager for managing applications that do not comply with the security protocol of the resident application environment/OS.
Figure 2:
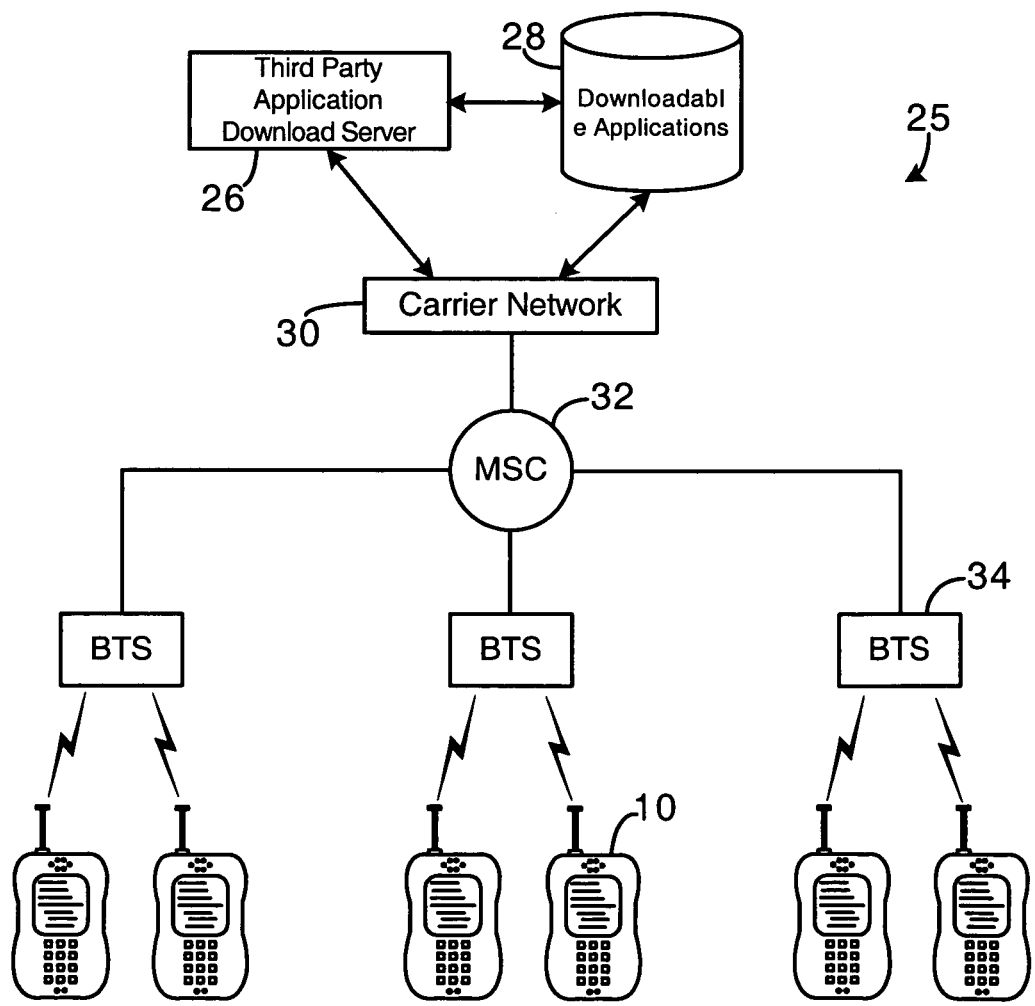
FIG. 2 is a representative diagram of one embodiment of a wireless network in a common cellular telecommunication configuration, having several computer devices that communicate with each other across the wireless network.

With reference to the figures in which like numerals represent like elements throughout, FIG. 1 illustrates block diagram of a computer architecture on a wireless device including a resident download manager for managing applications that do not comply with the security protocol of the resident application environment. The wireless device, such as cellular telephone 10, has a computer platform 12 that can receive and execute software applications transmitted from the application download server 26 (FIG. 2). The computer platform 12 includes, among other components, an application-specific integrated circuit ("ASIC") 14, or other processor, microprocessor, logic circuit, programmable gate array, or other data processing device. The ASIC 14 is installed at the time of manufacture of the wireless device and is not normally upgradeable. The ASIC 14 or other processor executes an application programming interface ("API") layer 16, which includes the resident application environment, and can include the operating system loaded on the ASIC 14. The resident application environment interfaces with any resident programs in the memory 20 of the wireless device. An example of a resident application environment is the "binary runtime environment for wireless" (BREW) software developed by Qualcomm® for wireless device platforms. There is also a download manager 16 for handling the download and/or execution of unverified programs as is further described herein.

As shown here, the wireless device can be a cellular telephone 10, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 20 can be comprised of read-only or random-access memory (RAM and ROM), EPROM, EEPROM, flash cards, or any memory common to computer platforms. The computer platform 12 can also include a local database 22 for storage of software applications not actively used in memory 20, such as the software applications downloaded from the third party application download server 26 (FIG. 2). The local database 22 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 10, has wireless communication capability through a wireless communication portal or communication interface 24 that selectively sends and receives data across a wireless network 25. The computer platform 12 resident application environment selectively downloads applications to the platform 12 through the portal (interface 24) and utilizes a predefined security protocol for at least downloading an application, such as the presence of a digital certificate, pubic key certificate, or other security protocol. A data store, such as local database 22 or in some instances memory 20, are in data communication with the computer platform 12. The download manager 18 is resident on the computer platform 12 at least selectively downloads applications that do not comply with the predefined security protocol to the computer platform 12, and preferably manages the handling of the unverified application through download, storage, and execution, as is further described herein.

Cellular telephones and telecommunication devices, such as cellular telephone 10, are being manufactured with increased computing capabilities and are becoming tantamount to personal computers and hand-held personal digital assistants ("PDAs"). These "smart" cellular telephones allow software developers to create software applications that are downloadable and executable on the processor, such as ASIC 14, of the cellular device 10. The wireless device, such as cellular telephone 10, can download many types of applications, such as web pages, applets, MIDlets, games and stock monitors, or simply data such as news and sports-related data. The downloaded data or executable applications can be immediately displayed on a display of the device 10 or stored in the local database 22 when not in use. The software applications can be treated as a regular software application resident on the wireless device 10, and the user can selectively upload stored resident applications from the local database 22 to memory 20 for execution on the API 16, i.e. within the resident application environment. However, if the application sought downloaded does not comply with a predefined security protocol, such as the verification of a certificate present in the download to insure the author of the download, the resident application environment will refuse to download the unverifiable application. The end-user of the wireless device 10 can also selectively attempt download non-security protocol complying applications. As a result, end-users of cellular telephones 12 can customize their telephones with programs, such as games, printed media, stock updates, news, or any other type of information or program available for download from application download servers through the wireless network 14.

FIG. 2 is a block diagram that more fully illustrates the components of the wireless network 25 in which the wireless device 12 operates. The wireless network 25 is merely exemplary and can include any system whereby remote modules communicate over-the-air between and among each other and/or between and among components of a wireless network 14, including, without limitation, wireless network carriers and/or servers. The server-side components are a third party application download server 26 and downloadable application database 28. Other server-side components will be present on the cellular data network with any other components that are needed to provide cellular telecommunication services. With the use of third party hardware readily scalable, the number of computer devices that can be made accessible to the wireless devices is theoretically unlimited.

The server-side components communicate with a carrier network 30 through a data link, such as the Internet, a secure LAN, WAN, or other network. The carrier network 30 controls messages (generally in the form of data packets) sent to a messaging service controller ("MSC") 32. The carrier network 30 communicates with the MSC 32 by a network, the Internet and/or POTS ("plain ordinary telephone system"). Typically, the network or Internet connection between the carrier network 30 and the MSC 32 transfers data, and the POTS transfers voice information. The MSC 32 is connected to multiple base stations ("BTS") 34. In a similar manner to the carrier network, the MSC 32 is typically connected to the BTS 34 by both the network and/or Internet for data transfer and POTS for voice information. The BTS 34 ultimately broadcasts messages wirelessly to the wireless devices, such as cellular telephone 10, by short messaging service ("SMS"), or other over-the-air methods known in the art.

In developing wireless networks 14, often called "3G" networks, if the end-user of the wireless device 10 desires to download and use a software application, the end-user will attempt to connect to an application download server 26, which is typically either the carrier's server or a third party application download server 26, through bridging a communication connection to the wireless network 25, and attempt to access and download the desired software application. Once the wireless device contacts the application download server 26, an initial contact is made and the application download server 26 can determine what applications and data are available to that wireless device 10 and send the appropriate information so that the end-user at the wireless device 10 can learn of the available applications and services.

A third party, such as an independent software vendor or developer, either through the third parties own computer devices or through a network carrier 30, to provide software applications as downloadable to the wireless device 10, which may or may not have the requisite security protocol to work on the platform 12 of the device. For example, the resident application environment may require the inclusion of a Verisign® digital certificate in the download in order to download the application. To allow the download and/or execution of the unverified/non-complying application, the present wireless device platform 12 includes a download manager 18 that can handle the unverified application partially or fully independently of the resident application environment.

One method of creating the download manager 18, particularly in BREW environment is to create a "Java Management Console" (JMC) using a standard "Java Virtual Machine" (JVM) extension. The JMC provides management functions for downloading an unverified application, such as applets and MIDlets, from the carrier network 30 or third party application download servers 26 through the existing API 16. The JMC stores unverified application in the resident BREW director and provides an end-user interface for selecting, launching, deleting, and saving the history of the unverified application. The JMC can be extended to support application specific auto-install or remove functionality, as well as support an alternative security protocol for the unverified application. Thus, in this embodiment, the download manager is a standard BREW application between the BREW JVM extension and the unverified executable content to perform all management and customer interface functions. Other embodiments of the download manager 18 can occur in other device operating systems and resident application environments.

The download manager 18 can exist entirely within resident application environment and use an existing application download interface, or can use its own interfaces to handle the unverified applications. The download manger 18 can be resident on the computer platform 12 at the time of manufacture, or can be downloaded thereto in operation of the wireless device. In one embodiment, the download manager 18 can be resident at the third party application download server 26 and transmitted to the computer platform 12 when the request of the unverified application is made.

The download manager 18 can manage execution, storage, installation/removal, or otherwise completely handle the downloaded application that does not comply with the predefined security protocol. The predefined security protocol can be verifying the origination of the application, the presence of a certificate within the downloaded application, or any other security protocol known in the art of network security. Further, the download manager can segregate and treat unverified downloaded applications in a different manner dependent upon criteria such as risk to the stability of the device OS, cost of download, nature of the end-user, or other predetermined criteria.

Figure 3:
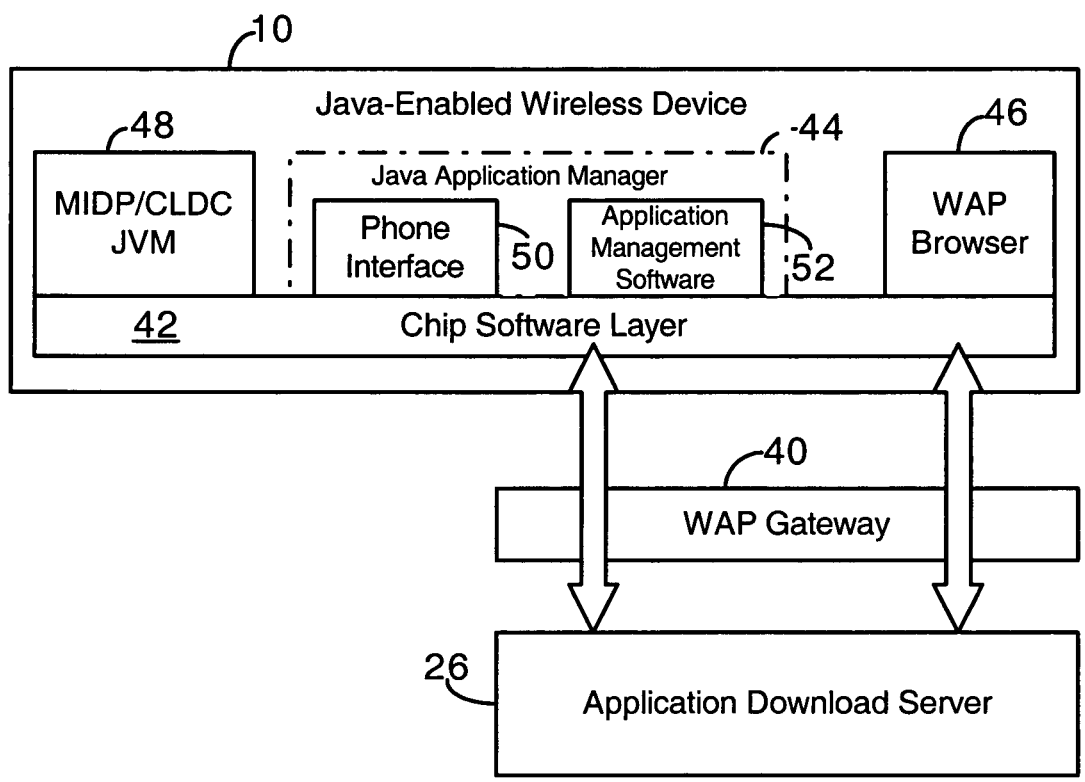
FIG. 3 is a block diagram illustrating the interaction between the computer platform of the wireless device and the application download server.

FIG. 3 is a block diagram illustrating the interaction between the computer platform of the wireless device 10 and the application download server 26 through a wireless application protocol (WAP) gateway 40. As shown, several threads of interaction can simultaneously occur between the device 10 and the server 26. On the chip software layer 42, there is a WAP browser 46 through which the user can locate a particular application, such as a Java MIDlet located at the application download server 26. The WAP browser 46 can then receive and transmit the requested application to the Java Application Manager 44, where application management software (AMS) 52 and the phone interface 50 (communication interface 24 in FIG. 1) reside, and includes the AMS in combination with a device specific user interface for handling MIDlet management and interaction with the subscriber. The MIDlet is then launched on the java virtual machine (JVM) as shown at block 48.

The user thus browses for and purchases an application from the application download server 26 through the WAP Gateway 40 and WAP browser 46. The application/MIDlet is then sent to the Java Application Manager 44, either directly from the application download server 26 or to the WAP Browser 46 and then to the Java Application manager 44. At the AMS 52, at least the downloaded application/MIDlet is unpackaged and installed, and alternately, other functionality can be implemented within the AMS 52, especially in regard to the Java activation framework for a Java MIDlet, such as requesting a Java application descriptor (JAD) file, processing a JAD, retrieving a Java archive file (JAR) locator, and/or requesting a JAR file. Once the application/MIDlet is ready for use, it is sent to the appropriate tool of the JVM for execution, as shown at block 48.

Figure 4:
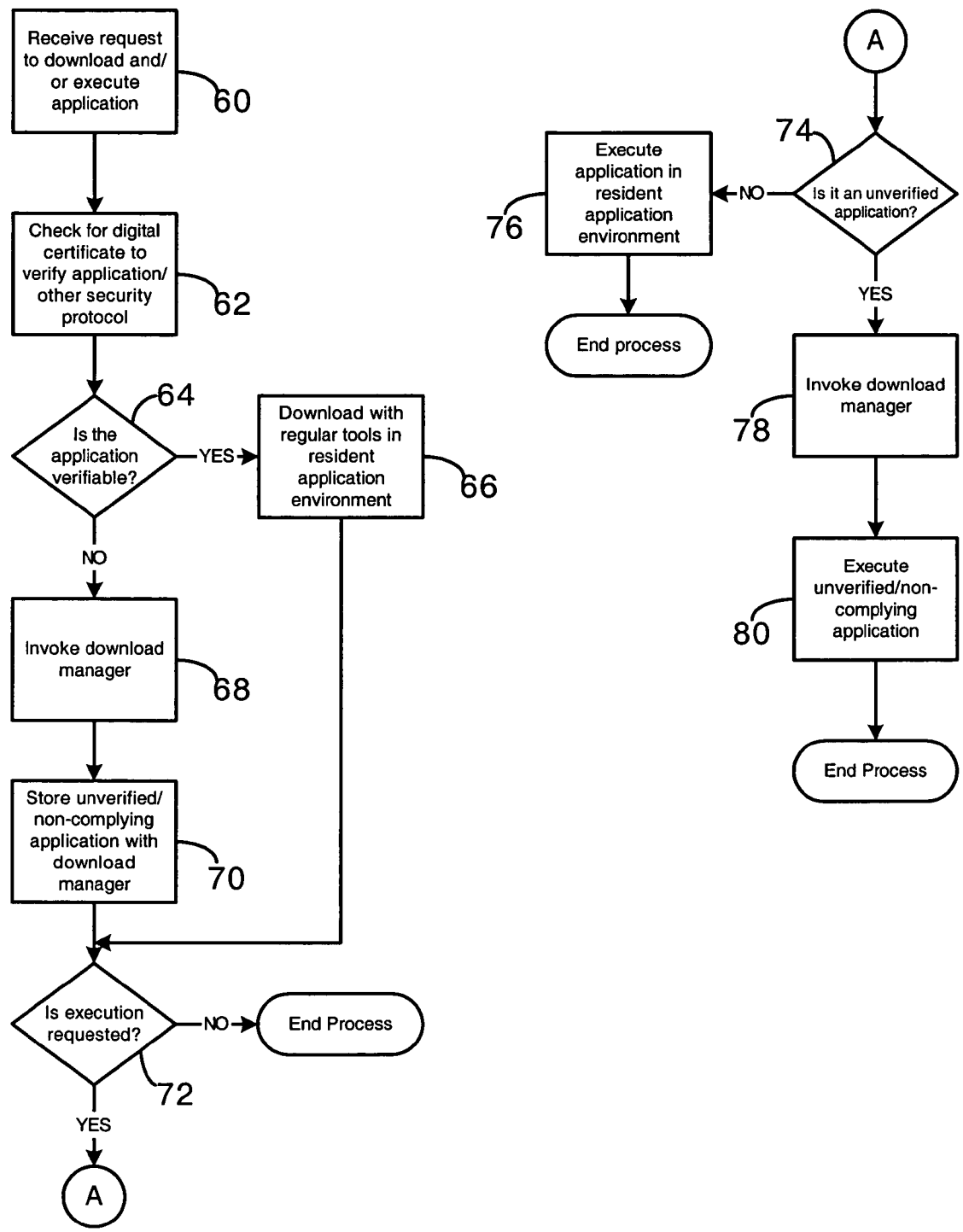
FIG. 4 is a flowchart of one embodiment of the process to download an unverified/non-security protocol complying application to the wireless device and execute the program independently of the resident application environment.

FIG. 4 is a flowchart of one embodiment of the process to download an unverified/non-security protocol complying application to the wireless device 10 and execute the program independently of the resident application environment (on API/OS layer 16). A request is received to download and/or execute after download an application, as shown at step 60, and then the digital certificate is verified, as shown at step 62, or other security protocol of the resident application environment occurs. A determination is then made as to whether the application is verifiable, or otherwise complies with security protocol sufficient to be downloaded and handled by the resident application environment, as shown at decision 64.

If the application sought downloaded at decision 64 does meet the security protocol (is verifiable), then the process forwards to make a determination as to whether the execution of the application has been requested, as shown at decision 72. Otherwise, if the application sought downloaded has not been verified or does not meet the security protocol for download and/or handling by the resident application environment at decision 64, then the download manager 18 is invoked as shown at step 68. In this embodiment, the unverified application is downloaded and stored as controlled by the download manager 18, as shown at step 70. Then, and after the download of a verified, secure application at decision 64, a decision is then made as to whether the execution of the downloaded application as shown at decision 72. If execution is not requested at decision 72, then the process ends.

Otherwise, if execution of the downloaded application is requested at decision 72, then a determination is made as to whether the application sought executed is an unverified application or does not comply with the security protocol, as shown at decision 74. If the application is not an unverified application at decision 74, then the application is executed in the resident application environment, as shown at step 76, such as on the standard OS of the device platform. If the application sought executed is an unverified application at decision 74, the download manager is invoked, as shown at step 78, and then executes the unverified application as shown at step 80. After the execution, the download/execution process terminates. As is seen in FIG. 4, an unverified application can be downloaded with or without the download manager 18, and then the download manager 18 can be invoked at the time of execution. The downloaded application can be immediately executed, or stored and then later executed on the download manager 18.

It can thus be seen that the wireless device 10 therefore provides a method for of selectively downloading through a wireless connection to a computer device, such as wireless device 10, an application that does not comply with a predefined security protocol for use at that computer device 10 including the steps of downloading to a computer platform 12 of the computer device 10 an application that does not comply with a predefined security protocol for use at that computer device 10, the computer platform 12 including a resident application environment for downloading and executing applications utilizing a predefined security protocol, the downloading occurring through the use of a download manager 18 resident on the computer platform 12, and the executing the application at the computer device 10 with the download manager 18. If the download manager 18 exists within resident application environment, the step of downloading can use an existing application download interface.

The method can further include the steps of storing, with the download manager 18, the unverified downloaded, and then executing the stored application with the download manager 18. The predefined security protocol can be verification of the nature of the downloaded application, such as through location of the presence of a certificate within the downloaded application. Further, the method can include the step of downloading the download manager 18 to the computer platform 12 of the computer device 10 after a request to download an unverified application has been made, and prior to the step of downloading the requested application.

The method accordingly can be implemented by the execution of a program held computer readable medium, such as the memory 20 of the computer platform 12. The instructions can reside in various types of signal-bearing or data storage primary, secondary, or tertiary media. The media may comprise, for example, RAM (not shown) accessible by, or residing within, the wireless device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A computer device having wireless communication capability, comprising:
   a processor;
   a wireless communication portal for selectively sending and receiving data across a wireless network;
   a download manager configured to selectively download applications that do not comply with a predefined security protocol, wherein non-compliance of the applications with the predefined security protocol is determined based upon information associated with the applications in response to an attempt to download the applications and prior to execution of the applications;
   a computer platform including a resident application environment configured to selectively download applications to the computer platform that comply with the predefined security protocol, the computer platform further configured to determine not to use the resident application environment for downloading an application that does not comply with the predefined security protocol and to download the download manager in response to a request to download the application that does not comply with the predefined security protocol; and
   a data store in communication with the computer platform configured to selectively send data to and receive data from the computer platform,
   wherein the selectively downloaded applications that comply with the predefined security protocol are executed by the computer platform within the resident application environment, and
   wherein the application that does not comply with the predefined security protocol is executed by the download manager outside of the resident application environment.

2. The device of claim 1, wherein the download manager is installed within the resident application environment and uses an existing application download interface.

3. The device of claim 1, wherein the application that does not comply with the predefined security protocol is immediately executed by the download manager after the download of the application that does not comply with the predefined security protocol.

4. The device of claim 1, wherein the application that does not comply with the predefined security protocol is stored, and the stored application is executed through the download manager.

5. The device of claim 1, wherein the download manager further manages storage of the application that does not comply with the predefined security protocol in the data store.

6. The device of claim 1, wherein the predefined security protocol is verifying an origination of a given application to be downloaded.

7. The device of claim 1, wherein the predefined security protocol is verifying a presence of a certificate within a given application to be downloaded.

8. The computer device of claim 1,
wherein the download manager is installed within the resident application environment and uses an existing application download interface.

9. The computer device of claim 1, wherein the predefined security protocol includes an application validation requirement of the resident application environment.

10. The computer device of claim 1, wherein the applications being downloaded by the resident application environment in compliance with the predefined security protocol and the non-complying application being downloaded by the download manager in non-compliance with the predefined security protocol are both stored in the data store.

11. The computer device of claim 1, wherein the predefined security protocol is configured to protect the computer device.

12. A computer device having wireless communication capability, comprising:
a processor;
a wireless communication means for selectively sending and receiving data across a wireless network;
a means for selectively downloading applications that do not comply with a predefined security protocol, wherein non-compliance of the applications with the predefined security protocol is determined based upon information associated with the applications in response to an attempt to download the applications and prior to execution of the applications;
a computer means for selectively downloading applications, the computer means configured to selectively download applications through the wireless communication means that comply with a predefined security protocol, the computer means further configured to determine not to use a resident application environment for downloading an application that does not comply with the predefined security protocol and to download code for configuring the means for selectively downloading applications in response to a request to download the application that does not comply with the predefined security protocol; and
wherein the selectively downloaded applications that comply with the predefined security protocol are executed by the computer means within the resident application environment, and
wherein the application that does not comply with the predefined security protocol is executed by the means for selectively downloading applications outside of the resident application environment.

13. A method of selectively downloading through a wireless connection to a computer device, comprising the steps of:
receiving a request to download an application that does not comply with a predefined security protocol for use at the computer device, wherein non-compliance of the application with the predefined security protocol is determined based upon information associated with the application in response to an attempt to download the application and prior to execution of the application;
determining not to use a resident application environment for downloading the application based upon the non-compliance of the application with the predefined security protocol, wherein the resident application environment is configured to download and execute applications that comply with the predefined security protocol inside of the resident application environment;
downloading, in response to the received request, a download manager configured to manage download and execution functions for applications that do not comply with the predefined security protocol;
downloading, from the wireless connection to the computer device, the non-complying application via the download manager; and
executing the non-complying application at the computer device with the download manager outside of the resident application environment.

14. The method of claim 13, wherein the download manager is installed within the resident application environment and the downloading of the non-complying application uses an existing application download interface.

15. The method of claim 13, further comprising the steps of:
storing, with the download manager, the non-complying application,
wherein the executing executes the stored application through the download manager.

16. The method of claim 13, further comprising the step of verifying whether the non-complying application complies with the predefined security protocol.

17. The method of claim 16, wherein the step of verifying includes verifying a presence or absence of a certificate within the non-complying application.

18. The method of claim 13,
wherein the attempt to download the application is triggered by a request to download the application that is issued to the resident application environment,
wherein the determination not to use the resident application environment for download the application corresponds to the resident application environment refusing to grant the request,
wherein the download manager is subsequently requested to download the given application after the refusal, and
wherein the downloading of the non-complying application occurs responsive to the subsequent request.

19. A method of selectively downloading through a wireless connection to a computer device, comprising:
receiving a request to download an application that does not comply with a predefined security protocol for use at the computer device, wherein non-compliance of the application with the predefined security protocol is determined based upon information associated with the application in response to an attempt to download the application and prior to execution of the application;

determining not to use a resident application environment for downloading the application based upon the non-compliance of the application with the predefined security protocol, wherein the resident application environment is configured to download and execute applications that comply with the predefined security protocol;

downloading, in response to the received request, a download manager configured to manage download and execution functions for applications that do not comply with the predefined security protocol;

downloading, through the wireless connection to the computer device, the non-complying application via the download manager device; and executing the downloaded application at the computer device outside of the resident application environment, wherein applications that comply with the predefined security protocol are configured for execution within the resident application environment.

20. A non-transitory computer-readable medium containing program code stored thereon, that when executed by a computer device causes the device to perform the steps of:

receiving a request to download an application that does not comply with a predefined security protocol for use at the computer device, wherein non-compliance of the application with the predefined security protocol is determined based upon information associated with the application in response to an attempt to download the application and prior to execution of the application;

determining not to use a resident application environment for downloading the application based upon the non-compliance of the application with the predefined security protocol, wherein the resident application environment is configured to download and execute applications that comply with the predefined security protocol inside of the resident application environment;

downloading, in response to the received request, a download manager configured to manage download and execution functions for applications that do not comply with the predefined security protocol;

downloading, through a wireless connection to a computer platform of the computer device, the non-complying application via the download manager; and executing the non-complying application at the computer device with the download manager outside of the resident application environment.

21. The non-transitory computer-readable medium of claim 20, wherein the download manager is resident on the computer platform.

22. A computer device having wireless communication capability, comprising:

a processor;

a wireless communication portal for selectively sending and receiving data across a wireless network;

a download manager configured to selectively download applications that are unverified, wherein the applications being unverified is determined based upon information associated with the applications in response to an attempt to download the applications and prior to execution of the applications;

a computer platform including a resident application environment configured to selectively download applications to the computer platform that are verified, the computer platform further configured to determine not to use the resident application environment for downloading an application that is unverified and to download the download manager in response to a request to download the application that is unverified; and a data store in communication with the computer platform and configured to selectively send data to and receive data from the computer platform, wherein the selectively downloaded applications that are verified are executed by the computer platform within the resident application environment, and wherein the application that is unverified is executed by the download manager outside of the resident application environment.

23. The computer device of claim 22, wherein the application that is unverified corresponds to a given application that has not been verified to operate properly in the resident application environment.

24. A method of selectively downloading through a wireless connection to a computer device, comprising:

receiving a request to download an unverified application that is unverified to operate properly in a resident application environment on the computer device, wherein the application being unverified is determined based upon information associated with the application in response to an attempt to download the application and prior to execution of the application;

determining not to use a resident application environment for downloading the application based upon the application being unverified, wherein the resident application environment is configured to download and execute applications that are verified to operate properly in the resident application environment;

downloading, in response to the received request, a download manager configured to manage download and execution functions for applications that are unverified;

downloading, through the wireless connection to the computer device, the unverified application via the download manager; and executing the unverified application by the download manager outside of the resident application environment, wherein applications that are verified to operate properly in the resident application environment are configured for execution within the resident application environment.

25. The method of claim 24, further comprising:

transmitting the request to download the unverified application to a server, wherein the download manager is downloaded in response to the transmitted request before the unverified application is downloaded via the download manager.

* * * * *